US012255035B2

(12) United States Patent
Schuster et al.

(10) Patent No.: US 12,255,035 B2
(45) Date of Patent: Mar. 18, 2025

(54) ON-LOAD TAP CHANGER

(71) Applicant: Maschinenfabrik Reinhausen GmbH, Regensburg (DE)

(72) Inventors: Thomas Schuster, Regensburg (DE); Georg Kellendorfer, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 81 days.

(21) Appl. No.: 17/775,589

(22) PCT Filed: Sep. 14, 2020

(86) PCT No.: PCT/EP2020/075629
§ 371 (c)(1),
(2) Date: May 10, 2022

(87) PCT Pub. No.: WO2021/094013
PCT Pub. Date: May 20, 2021

(65) Prior Publication Data

US 2022/0415587 A1 Dec. 29, 2022

(30) Foreign Application Priority Data

Nov. 12, 2019 (DE) ..................... 10 2019 130 460.1

(51) Int. Cl.
*H01H 9/00* (2006.01)

(52) U.S. Cl.
CPC ........ *H01H 9/0027* (2013.01); *H01H 9/0011* (2013.01); *H01H 9/0038* (2013.01); *H01H 2009/0094* (2013.01)

(58) Field of Classification Search
CPC .. H01H 9/0027; H01H 9/0005; H01H 9/0016; H01H 9/0038; H01H 2009/0061;
(Continued)

(56) References Cited

U.S. PATENT DOCUMENTS 2,157,814 A * 5/1939 Bolte ........................ H01H 3/38 200/462
3,421,073 A 1/1969 Perkins
(Continued)

FOREIGN PATENT DOCUMENTS

AT 224219 B 11/1962
DE 724502 C 8/1942
(Continued)

*Primary Examiner* — Ahmed M Saeed
(74) *Attorney, Agent, or Firm* — LEYDIG, VOIT & MAYER, LTD.

(57) ABSTRACT

An on-load tap changer is for uninterrupted diverter switch operation. The on-load tap changer includes: a first module having a first module shaft; and a second module having a second module shaft. The first module shaft is configured to actuate the first module. The second module shaft is configured to actuate the second module. The first module shaft and the second module shaft are mechanically coupled to one another in such a way that the first module shaft is configured to drive the second module shaft and the second module is configured to be actuated with a time delay with respect to the first module.

11 Claims, 4 Drawing Sheets

(58) Field of Classification Search
CPC ...... H01H 9/0033; H01H 3/44; H01H 9/0011; H01H 9/0044
See application file for complete search history.

(56) References Cited

U.S. PATENT DOCUMENTS

| | | | | |
|---|---|---|---|---|
| 4,246,558 | A | 1/1981 | Zubaty et al. | |
| 6,060,669 | A * | 5/2000 | Dohnal | H01H 9/0033 200/11 TC |
| 9,941,064 | B2 * | 4/2018 | Hammer | H01F 29/02 |
| 2008/0074073 | A1 | 3/2008 | Genkawa | |
| 2013/0206555 | A1 * | 8/2013 | Donhauser | H01F 29/025 200/11 TC |
| 2013/0213776 | A1 | 8/2013 | Hoepfl et al. | |
| 2015/0068877 | A1 * | 3/2015 | Hoepfl | H01H 9/0027 200/11 TC |
| 2022/0415587 | A1 | 12/2022 | Schuster et al. | |

FOREIGN PATENT DOCUMENTS

| | | | |
|---|---|---|---|
| DE | 29814184 | U1 | 9/1999 |
| DE | 102010007535 | A1 | 8/2011 |
| JP | H11097257 | A | 4/1999 |
| JP | 2008085037 | A | 4/2008 |
| WO | WO 2012135213 | A1 | 10/2012 |

* cited by examiner

ON-LOAD TAP CHANGER

CROSS REFERENCE TO RELATED APPLICATIONS

This application is a U.S. National Phase application under 35 U.S.C. § 371 of International Application No. PCT/EP2020/075629, filed on Sep. 14, 2020, and claims benefit to German Patent Application No. DE 10 2019 130 460.1, filed on Nov. 12, 2019. The International Application was published in German on May 20, 2021 as WO 2021/094013 A1 under PCT Article 21(2).

FIELD

The invention relates to an on-load tap changer for uninterrupted diverter switch operation between different winding taps of a tap changing transformer.

BACKGROUND

On-load tap changers usually consist of a diverter switch and a selector. The diverter switch, with the vacuum interrupters and the transition resistors, is arranged in a vessel. The selector is made up of a multiplicity of bars arranged in a circle. Contacts which serve as connections for the individual taps of the tap windings are arranged at different levels on said bars. Inside the selector, two selector arms are attached to a switching column. They make contact with the contacts on the bars. Diverter switch and selector are connected to each other via a gear unit.

The on-load tap changer is actuated by means of a drive which, on the one hand, winds up a spring energy accumulator in order to actuate the diverter switch and, on the other hand, moves the selector arms in order to preselect the contacts to be switched. The contacts and switching means of all three phases are always actuated simultaneously both in the diverter switch and in the selector. This inevitably leads to torque peaks, since the same contacts of each phase have to be actuated at the same time. The drive, spring accumulator and gear unit have to be configured in such a way that they can handle the torque peaks.

SUMMARY

In an embodiment, the present disclosure provides an on-load tap changer that is for uninterrupted diverter switch operation. The on-load tap changer includes: a first module having a first module shaft; and a second module having a second module shaft. The first module shaft is configured to actuate the first module. The second module shaft is configured to actuate the second module. The first module shaft and the second module shaft are mechanically coupled to one another in such a way that the first module shaft is configured to drive the second module shaft and the second module is configured to be actuated with a time delay with respect to the first module.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
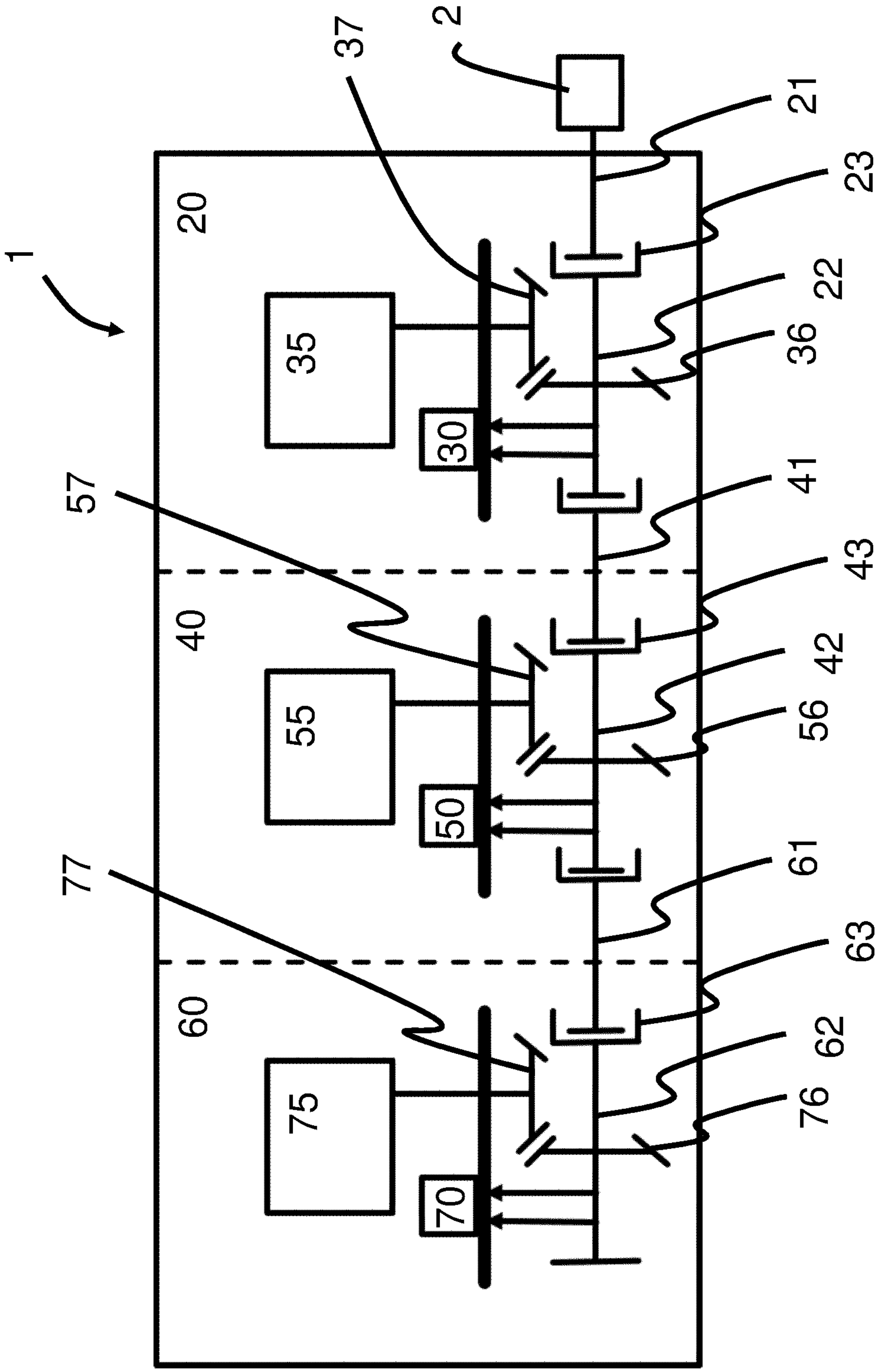
FIG. 1 shows a first embodiment of an on-load tap changer.

Embodiments of the present invention provide an on-load tap changer that generates significantly smaller torque peaks during actuation, has a simple and compact design, and at the same time ensures reliable operation.

According to a first aspect, the present invention provides an on-load tap changer for uninterrupted diverter switch operation between different winding taps of a tap changing transformer, comprising:

- a first module with a first module shaft;
- a second module with a second module shaft;
- the first module shaft actuates the first module;
- the second module shaft actuates the second module;
- the first and second module shafts are mechanically coupled to one another in such a way that the first module shaft drives the second module shaft and the second module is actuated with a time delay with respect to the first module.

Torque peaks are significantly reduced by dividing the on-load tap changer into individual modules and mechanically coupling the latter with an offset. This is achieved in that, although the elements to be actuated of the modules of the on-load tap changer are driven simultaneously, they are actuated one after the other with a slight offset. The offset is just large enough that no negative electrical interactions occur between the individual phases of a tap changing transformer, but the torque increases that occur are slightly offset from one another. This enables the use of a significantly simpler and therefore more advantageous motor. Furthermore, the individual parts of the drive shaft can be made smaller since they have to withstand smaller torque loads. This also has a positive effect on the cost of the entire switch. Without a mechanically offset coupling, the same elements would be moved or actuated in each module at the same time. The required force would add up, and this would require a drive with corresponding power.

Each module can be designed in any way as required and can include a module shaft, for example. The first module shaft of the first module is mechanically coupled to the second module shaft of the second module. The module shafts are mechanically connected to one another with an offset from one another in such a way that the individual modules are actuated with an offset from one another. In other words, although the two module shafts start rotating at the same time, the effect thereof (opening and closing of vacuum interrupters) on the elements in the modules takes place with a time delay.

The module shafts can be connected to one another in any way as required, for example via insulating bars, insulating shafts or chains.

The offset between the modules and in particular between the module shafts can be designed in any way as required, for example as offset connecting pins on the module shafts and identically designed insulating shafts or insulating shafts with offset receptacles and identical module shafts. How the offset between the module shafts is ultimately realized is irrelevant.

The diverter switch can be designed in any way as required and can, for example, comprise at least two or more modules. The modules are each assigned to a phase of a tap changing transformer.

Each module can be designed in any way as required and can, for example, comprise at least one diverter switch and one selector. The diverter switch can include at least one switching element and one current-limiting element. The at least one switching element can be designed as a vacuum interrupter or as a simple mechanical switch. The current-limiting element is preferably a resistor, a reactor or a current-dependent resistor. The selector has at least one selector arm, preferably two selector arms as a tap selector and/or a change-over selector arm as a change-over selector.

Each module shaft can be designed in any way as required and, for example, can have a connecting pin, bolt, feather keys or any other connecting element at each end. The connecting pins are not axially parallel and are preferably offset from one another by a maximum of 15 degrees. The connecting pins, bolts or feather keys can be inserted only on one side or extend through the entire module shaft.

Each module shaft can be designed in any way as required and, for example, can have a first connecting pin at a first end and a second connecting pin at a second end. The first connecting pin may run along a first axis A and the second connecting pin may run along a second axis B, wherein the axes A and B are not axially parallel and are preferably offset by an angle of a maximum of 15 degrees.

The drive can be designed in any way as required and, for example, can include at least one motor and/or a gear unit. The motor can be designed as a synchronous motor with a multi-turn absolute encoder or as a DC motor with micro-switches.

Provision can be made for the module shafts and the insulating shafts to be connected via couplings and/or couplings with a plurality of coupling brackets.

Provision can be made for a motor to be connected directly to the drive shaft or indirectly to the insulating shaft or the first module shaft of the on-load tap changer via a gear unit, bevel gear or linkage.

Identical reference signs are used for elements of the invention that are identical or functionally identical. Furthermore, for the sake of clarity, each of the individual figures contains only those reference signs necessary for the description of said figure. The illustrated embodiments merely illustrate examples of how the on-load tap changer according to the invention can be designed and therefore do not represent a final delimitation of the invention.

FIG. 1 shows a schematic design of an on-load tap changer 1 according to an embodiment of the invention. The latter has a first module 20, a second module 40, and a third module 60. Each of the modules 20, 40, 60 is assigned to a phase of a tap changing transformer. The first module 20 has a first module shaft 22. The first module shaft 22 is connected or coupled at its first end 23 to a drive 2. The drive 2 is designed as a motor drive with or without a gear unit and is preferably mechanically connected to the first end 23 of the first module shaft 22 via a first insulating shaft 21. The first module 20 has a diverter switch 30 and a selector 35. The diverter switch 30 and in particular the vacuum interrupters thereof are actuated directly via the first module shaft 22. Here, two cam disks 32 are seated on the first module shaft 22 and, as they rotate, open and close the vacuum interrupters. Furthermore, on the first module shaft 22 there is a first bevel wheel 36 which drives a second bevel wheel 37 which, in turn, actuates the individual selector arms of the selector 35. During driving of the first module shaft 22, the diverter switch 30 and the selector 35 are thus actuated in a specific order; the first module 20 of the on-load tap changer 1 is actuated.

Furthermore, the on-load tap changer 1 has a second module 40 and a third module 60. The three modules 20, 40, 60 are constructed identically to one another. The three modules are also mechanically coupled to one another via a second and a third insulating shaft 41, 61. The drive 2 drives the first module 20 via the first insulating shaft 21, the first module 20 drives the second module 40 via the second insulating shaft 41, and the second module 40 drives the third module 60 via the third insulating shaft 61. The second and the third module 40, 60 each also have a diverter switch 50, 70, a selector 55, 75 and module shafts 42, 62. The respective selectors 55, 75 are driven via respective bevel wheels 56, 57, 76, 77.

Figure 2A:
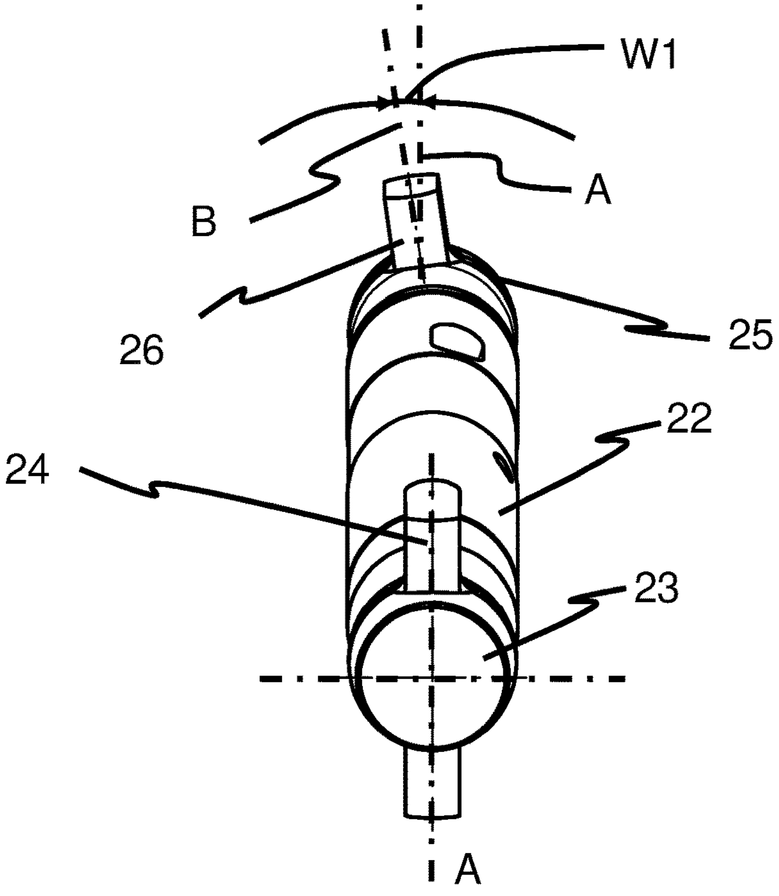
FIG. 2*a* shows a detailed view of a module shaft.

FIG. 2*a* shows a detailed view of the first module shaft 22 which has a first connecting pin 24 at its first end 23. The first module shaft 22 is connected to the drive 2 via this first connecting pin 24, for example via a first insulating shaft 21. Furthermore, the first module shaft 22 has a second connecting pin 26 at its second end 25. The second connecting pin 26 is not arranged axially parallel to the first connecting pin 24 on the module shaft 22. In other words, the second connecting pin 26 is offset by a few degrees from the first connecting pin 24. Bolts, feather keys or any other connecting element can be used as an alternative to the connecting pins. The connecting pin can protrude only on one side or extend from one side to the second, opposite side.

Figure 2B:
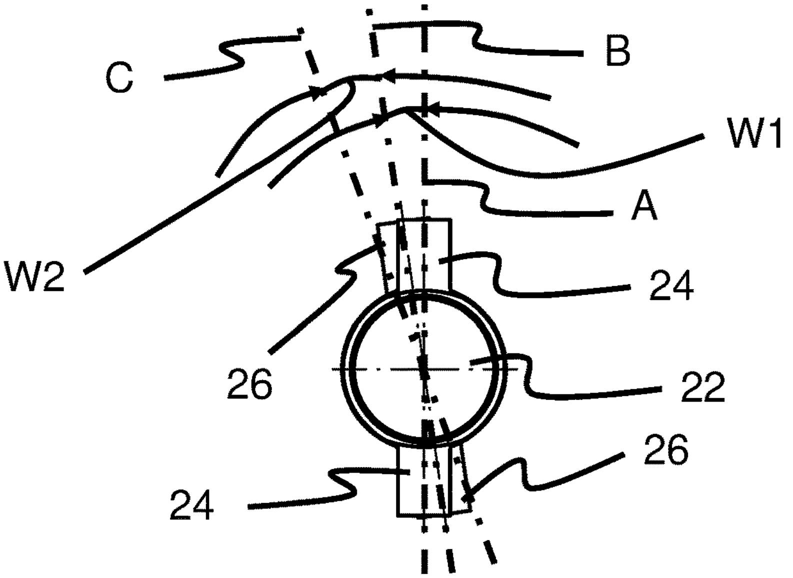
FIG. 2*b* shows a front view of a module shaft.

FIG. 2*b* shows a front view of the module shaft 22. Axis A is intended to show the orientation of the first connecting pin 24. Axis B shows the orientation of the second connecting pin 26. The axes A and B are offset from one another at an angle W1 of preferably a maximum of 15 degrees. If a second module shaft 42 were now placed behind the first module shaft 22 and connected to the latter, the first connecting pin 44 of the second module shaft 42 would run axially parallel to the axis B of the second connecting pin 26 of the first module shaft 2. Each module shaft 22, 42, 62 is configured identically, i.e. the second connecting pin 26, 46, 66 is offset from the respective first connecting pin 24, 44, 64. Axis C shows the orientation of the second connecting pin 46 of the second module shaft 42. The angle W2 between the axes B and C is identical to the angle W1 between the axes A and B.

Figure 3:
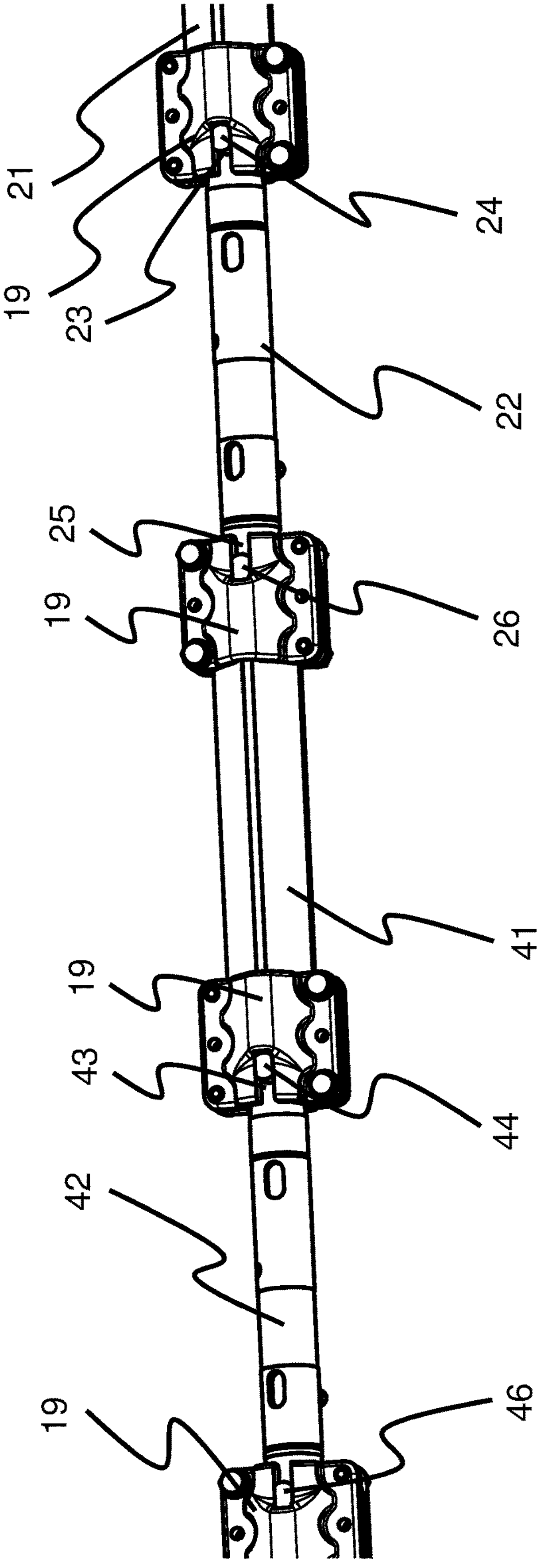
FIG. 3 shows a plurality of module shafts of an on-load tap changer according to an embodiment of the present invention.

FIG. 3 shows a detailed view of two module shafts connected to one another, in particular the first module shaft 22 and the second module shaft 42. The first connecting pin 24 at the first end 23 of the first module shaft 22 is offset from the second connecting pin 26 at the second end 25. The first end 23 of the first module shaft 22 is connected to a drive 2 via a first insulating shaft 21. The connection between the first insulating shaft 21 and the first module shaft 22 is realized by means of a coupling 19, which preferably has two coupling brackets. However, any type of coupling may be used. The second end 25 of the first module shaft 22 is connected to the first end 43 of the second module shaft 42 via a second insulating shaft 41. As now becomes clear, the first connecting pins 24, 44 of the respective module shafts 22, 42 are connected to one another with an offset from one another. As soon as the drive 2 begins to rotate or drive the first insulating shaft 21, the other shafts also rotate therewith. However, the modules 20, 40, 60 are actuated at an offset, since the cam disks and also the first bevel wheel of the second module 40 or third module 60 are offset from the cam disks and from the first bevel wheel of the first module 20.

The insulating shafts 41, 61 are configured identically here, i.e. the couplings 19 at the respective ends are identical. As an alternative to the module shafts with offset connecting pins, the insulating shafts can also have offset couplings at the respective ends. This also results in an offset mechanical coupling of the modules. The modules are driven simultaneously and together, but actuated with a time delay.

Figure 4:
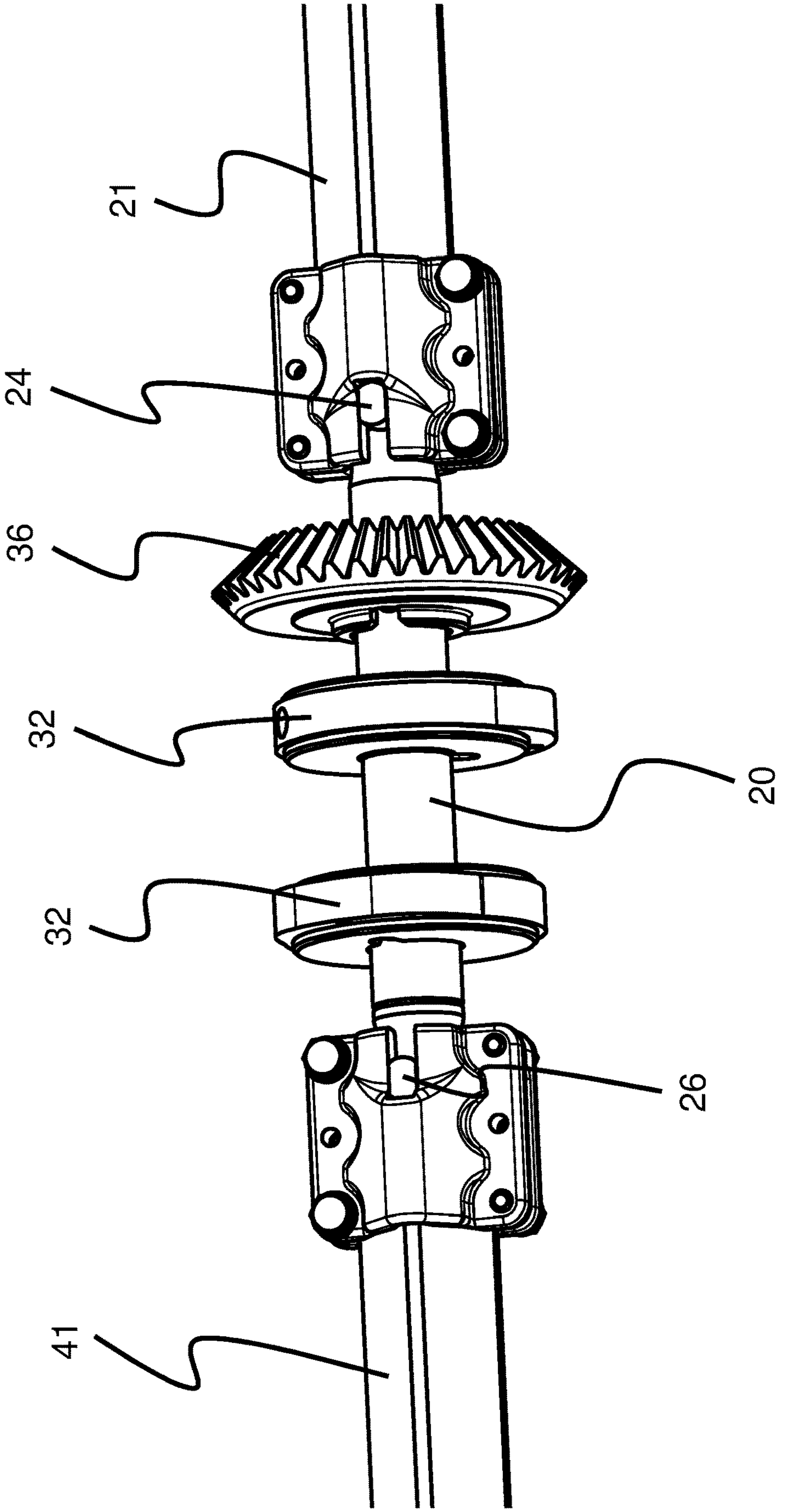
FIG. 4 shows a further detailed view of a module shaft.

FIG. 4 shows a detailed view of one of the module shafts 20, 40, 60, in particular the first module shaft 20, wherein the second and third module shaft 40, 60 are constructed identically. Two cam disks 32 for actuating the vacuum interrupters and a first bevel wheel 36 for actuating the selector 35 are arranged on the module shaft 20. Within a 360 degree rotation of the module shaft 20, the diverter switch 30 and the selector 35 are actuated. Depending on where the module shaft 20 is located, individual actions in the on-load tap changer, such as opening or closing the vacuum interrupters of a switching sequence, are carried out at a specific point in time. As soon as at least two module shafts 40, 60 are coupled with an offset from one another, the actions in the second module 40 take place correspondingly with a slight offset from the first module 20; finally, the modules 20, 40, 60 are constructed identically. Although the second module 40 is driven at the same time as the first module 20, the actual actuation of the second module 40 (opening or closing of the vacuum interrupters) takes place with a time delay.

As an alternative to the module shafts 20, 40, 60 with offset connecting pins, the insulating shafts could also have offset receptacles at the two ends. The module shafts are therefore also mechanically connected with an offset from one another.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 On-load tap-changer
2 Drive
19 Coupling
20 First module
21 First insulating shaft
22 First module shaft
23 First end of 22
24 First connecting pin of 22
25 Second end of 22
26 Second connecting pin of 22
30 Diverter switch
32 Cam disks
35 Selector
36 First bevel wheel
37 Second bevel wheel
40 Second module
41 Second insulating shaft
42 Second module shaft
43 First end of 42
44 First connecting pin of 42
45 Second end of 42
46 Second connecting pin of 42
50 Diverter switch
55 Selector
60 Third module
61 Third insulating shaft
62 Third module shaft
63 First end of 62
64 First connecting pin of 62
65 Second end of 62
66 Second connecting pin of 62
70 Diverter switch
75 Selector

The invention claimed is:

1. An on-load tap changer for uninterrupted diverter switch operation, the on-load tap changer comprising:
a first module comprising a first module shaft;
a second module comprising a second module shaft; and
a third module comprising a third module shaft;
wherein:
the first module shaft is configured to actuate the first module;
the second module shaft is configured to actuate the second module;
the first module shaft and the second module shaft are mechanically coupled to one another in such a way that the first module shaft is configured to drive the second module shaft and the second module is configured to be actuated with a time delay with respect to the first module, and
the third module shaft is configured to actuate the third module and the second module shaft and the third module shaft are mechanically coupled to one another in such a way that the second module shaft is configured to drive the third module shaft and the third module is configured to be actuated with a second time delay with respect to the second module.

2. The on-load tap changer as claimed in claim 1, wherein:
a drive is configured to drive the first module shaft.

3. The on-load tap changer as claimed in claim 1, wherein:
the first module and the second module are connected to one another via insulating shafts.

4. The on-load tap changer as claimed in claim 1, wherein:
each of the first module shaft and the second module shaft comprises a first connecting pin and a second connecting pin; and
the first connecting pin is offset from the second connecting pin.

5. The on-load tap changer as claimed in claim 1, wherein:

the first module shaft is connected to the second module shaft via a second insulating shaft; and the second module shaft is connected to the third module shaft via a third insulating shaft.

6. The on-load tap changer as claimed in claim 1, wherein:

each of the first module and the second module is assigned to a phase of a tap changing transformer.

7. The on-load tap changer as claimed in claim 1, wherein:

each of the first module and the second module comprises a diverter switch and a selector.

8. The on-load tap changer as claimed in claim 1, wherein the on-load tap changer further comprises:

a drive configured to actuate the first module and the second module by causing the first module shaft and the second module shaft to turn;

a first insulating shaft having a first end and a second end, the first end of the first insulating shaft being coupled to the drive and the second end of the first insulating shaft being coupled to the first module shaft; and a second insulating shaft having a first end and a second end, the first end of the second insulating shaft being coupled to the first module shaft and the second end of the second insulating shaft being coupled to the second module shaft, wherein each of the first module shaft and the second module shaft have a first end and a second end, wherein the on-load tap changer further comprises a respective first connecting pin at the first end of each of the first module shaft and the second module shaft and positioned at a first axial orientation, wherein the on-load tap changer further comprises a respective second connecting pin at the second end of each of the first module shaft and the second module shaft and positioned at a second axial orientation, wherein for each of the first module shaft and the second module shaft the first axial orientation is offset from the second axial orientation, wherein the on-load tap changer further comprises:

a first coupling, coupling the second end of the first insulating shaft to the first end of the first module shaft at a first offset constrained by the first connecting pin of the first module shaft;

a second coupling, coupling the second end of the first module shaft to the first end of the second insulating shaft at a second offset constrained by the second connecting pin of the first module shaft; and a third coupling, coupling the second end of the second insulating shaft to the first end of the second module shaft at a third offset constrained by the first connecting pin of the second module shaft.

9. The on-load tap changer as claimed in claim 8, wherein the first insulating shaft is configured identically to the second insulating shaft, and wherein the first module shaft, and the first and second connecting pins thereof, are configured identically to the second module shaft, and the first and second connecting pins thereof.

10. An on-load tap changer for uninterrupted diverter switch operation, the on-load tap changer comprising:

a first module comprising a first module shaft;

a second module comprising a second module shaft;

a drive configured to actuate the first module and the second module by causing the first module shaft and the second module shaft to turn;

a first insulating shaft having a first end and a second end, the first end of the first insulating shaft being coupled to the drive and the second end of the first insulating shaft being coupled to the first module shaft; and a second insulating shaft having a first end and a second end, the first end of the second insulating shaft being coupled to the first module shaft and the second end of the second insulating shaft being coupled to the second module shaft, wherein the first module shaft is configured to actuate the first module;

wherein the second module shaft is configured to actuate the second module;

wherein the first module shaft and the second module shaft are mechanically coupled to one another in such a way that the first module shaft is configured to drive the second module shaft and the second module is configured to be actuated with a time delay with respect to the first module, wherein each of the first module shaft and the second module shaft have a first end and a second end, wherein the on-load tap changer further comprises a respective first connecting pin at the first end of each of the first module shaft and the second module shaft and positioned at a first axial orientation, and wherein the on-load tap changer further comprises a respective second connecting pin at the second end of each of the first module shaft and the second module shaft and positioned at a second axial orientation.

11. The on-load tap changer as claimed in claim 10, wherein the first insulating shaft is configured identically to the second insulating shaft, and wherein the first module shaft, and the first and second connecting pins thereof, are configured identically to the second module shaft, and the first and second connecting pins thereof.

* * * * *